(12) United States Patent
Mallinson

(10) Patent No.: US 7,920,209 B2
(45) Date of Patent: Apr. 5, 2011

(54) DELAY MATCHING IN AUDIO/VIDEO SYSTEMS

(75) Inventor: Dominic Saul Mallinson, Emerald Hills, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 12/615,942

(22) Filed: Nov. 10, 2009

(65) Prior Publication Data

US 2010/0053430 A1     Mar. 4, 2010

Related U.S. Application Data

(63) Continuation of application No. 11/165,473, filed on Jun. 22, 2005, now Pat. No. 7,636,126.

(51) Int. Cl.
*H04N 9/475* (2006.01)

(52) U.S. Cl. .................................... 348/515; 348/512

(58) Field of Classification Search .............. 348/512, 348/515, 706, 705, 722, 180, 192, 211.1, 348/738; 381/94.1, 300, 301, 303, 333, 386, 381/388, 26
See application file for complete search history.

(56) References Cited

U.S. PATENT DOCUMENTS

| | | | |
|---|---|---|---|
| 5,351,090 A | 9/1994 | Nakamura | |
| 5,387,943 A | 2/1995 | Silver | |
| 5,572,261 A | 11/1996 | Cooper | |
| 5,953,485 A * | 9/1999 | Abecassis | ............... 386/68 |
| 6,414,960 B1 * | 7/2002 | Kuhn et al. | ............ 370/395.64 |
| 6,803,964 B1 * | 10/2004 | Post et al. | ............... 348/423.1 |
| 6,912,010 B2 | 6/2005 | Baker | |
| 6,956,871 B2 | 10/2005 | Wang | |
| 7,333,150 B2 | 2/2008 | Cooper | |
| 2002/0041335 A1 | 4/2002 | Taraci | |
| 2002/0047937 A1 | 4/2002 | Wells | |
| 2003/0142232 A1 | 7/2003 | Albean | |
| 2004/0100582 A1 | 5/2004 | Stanger | |
| 2004/0263636 A1 | 12/2004 | Cutler | |
| 2005/0019020 A1 | 1/2005 | Sato | |
| 2005/0253965 A1 | 11/2005 | Cooper | |
| 2006/0015348 A1 * | 1/2006 | Cooper et al. | ............... 704/500 |
| 2006/0209210 A1 | 9/2006 | Swan | |

* cited by examiner

*Primary Examiner* — Victor Kostak

(74) *Attorney, Agent, or Firm* — Carr & Ferrell LLP

(57) ABSTRACT

An audio/video system comprises an audio signal processing path having an audio path delay and a video signal processing path having a video path delay. The audio path delay may be different from the video path delay. The audio path delay and/or the video path delay may change, for example because of replacement of a component within the audio signal processing path or the video signal processing path. Delay matching (synchronization) in the audio/video system comprises adjusting the audio path delay to be substantially equal to the video path delay. Matching the audio path delay to the video path delay generally includes adding delay to the signal processing path with the lesser delay.

15 Claims, 5 Drawing Sheets

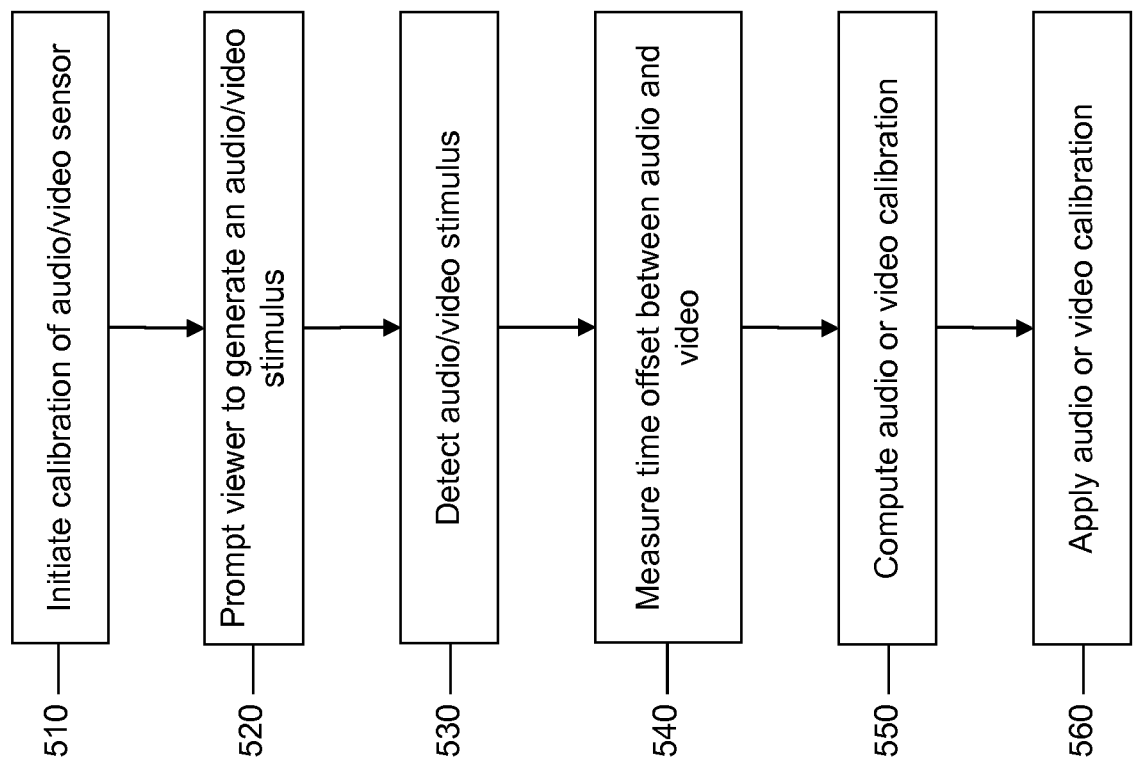

DELAY MATCHING IN AUDIO/VIDEO SYSTEMS

CROSS REFERENCE TO RELATED APPLICATIONS

This application is a continuation and claims the priority benefit of U.S. patent application Ser. No. 11/165,473 filed Jun. 22, 2005 now U.S. Pat. No. 7,636,126 and entitled "Delay Matching in Audio/Video Systems," the disclosure of which is incorporated herein by reference.

BACKGROUND OF THE INVENTION

1. Field of the Invention

This invention relates generally to audio/video systems and relates more particularly to delay matching in audio/video systems.

2. Description of the Related Art

Many home theater systems today include a number of audio/video sources connected to an audio/video processor and a video display. For example, the audio/video sources may include a DVD player, a satellite TV receiver, a video game console and the like, for playing content such as a movie. The content from a selected audio/video source is decoded in the audio/video processor to yield an audio portion and a video portion. The audio portion is decoded in the audio/video processor and played through an audio amplifier and a number of audio speakers. The video portion is shown on the video display, which may comprise an analog format television (TV) or a digital format high-definition television (HDTV).

The audio portion and the video portion can be considered as being processed through an audio signal processing path and a video signal processing path in the home theater system. One limitation with the home theater system is that the audio signal processing path and the video signal processing path can have differing delays. For example, the audio signal processing path might have less than three frames of delay and the video signal processing path might have six or more frames of delay (generally, an analog TV has a delay of about $\frac{1}{60}^{th}$ of a second in the video signal processing path, in comparison with about $\frac{1}{8}^{th}$ to $\frac{1}{5}^{th}$ of a second of delay for a digital HDTV). In general, a digital TV has significantly more delay than an analog TV.

Differing delays between the audio signal processing path and the video signal processing path can cause the audio portion of the content and the video portion of the content to become "out of sync" in time (i.e., the audio lagging behind the video, or with the video delayed with respect to the audio). For example, in DVD video playback, an actor's lips may be moving out of sync with his speech, or a gunshot flash and its associated sound may not be coincident in time. As little as $\frac{1}{30}^{th}$ of a second of time offset between the audio and video portions can generally be detected by a viewer. In a specific example, the viewer can easily detect the actor's lips moving out of sync with his speech if the audio portion leads the video portion by about 25 milliseconds (msec) or more, or if the audio portion lags the video portion by about 80 msec or more. The time mismatch between the audio portion and the video portion can cause significant distraction and dissatisfaction to the viewer.

SUMMARY

A system in accordance with the invention comprises an audio signal processing path configured to generate an audio stimulus, a video signal processing path configured to generate a video stimulus, a sensor, and a delay generator. The sensor is configured to detect a difference between an audio path delay of the audio signal processing path and a video path delay of the video signal processing path, based on the audio stimulus and the video stimulus. The delay generator is configured to adjust the audio path delay to be substantially equal to the video path delay. In some embodiments, the delay generator is configured to add delay into the audio signal processing path if the audio path delay is less than the video path delay, and add delay into the video signal processing path if the video path delay is less than the audio path delay.

In some embodiments, the audio signal processing path and the video signal processing path comprise a home theater system, which may comprise substitutable audio/video components. The sensor may comprise an audio/video camera, and may comprise a microphone and a light sensor.

A method comprises generating an audio stimulus in an audio signal processing path and a video stimulus in a video signal processing path, detecting the audio stimulus after an output of the audio signal processing path, detecting the video stimulus after an output of the video signal processing path, measuring a time offset between the detected audio stimulus and the detected video stimulus, and determining a calibration value that substantially cancels the measured time offset. The method may include prompting a user to provide the audio stimulus and the video stimulus into an audio/video camera. The method may include adding delay to the audio signal processing path if the detected audio stimulus leads (precedes) the detected video stimulus, or adding delay to the video signal processing path if the detected video stimulus leads the detected audio stimulus.

BRIEF DESCRIPTION OF THE FIGURES

FIG. 5 illustrates an optional calibration method for the audio/video sensor of FIG. 1, in one embodiment in accordance with the present invention.

DETAILED DESCRIPTION

Generally, an audio/video system comprises an audio signal processing path having an audio path delay and a video signal processing path having a video path delay. Delay refers to a time duration between an input being presented to the audio/video system (e.g., by content such as a movie played on a DVD player) and an output being generated by the audio/video system (e.g., a frame of the movie displayed on a video display). The audio path delay may be different from the video path delay. The audio path delay and/or the video path delay may change, for example because of replacement of a component within the audio signal processing path or the video signal processing path. Delay matching (i.e., synchronization) in the audio/video system comprises adjusting the audio path delay to be substantially equal to the video path delay. Matching the audio path delay to the video path delay generally includes adding delay to the signal processing path with the lesser delay.

As described further herein, methods for delay matching may be performed manually or fully automatically. In manual matching, a user (viewer) of the audio/video system determines whether the audio path delay matches the video path delay, and accordingly adds delay to the appropriate signal processing path to synchronize the audio path delay to the video path delay. In fully automated calibration, the audio/video system autonomously generates an audio/video stimulus, which stimulus is detected by one or more audio and video sensors. The audio/video system measures the time offset between the detected audio stimulus and the detected video stimulus. The audio/video system adds delay to the appropriate signal processing path to synchronize the audio path delay to the video path delay.

Matching the delay between the audio signal processing path and the video signal processing path may be particularly beneficial in audio/video systems such as home theater systems, in which audio/video components with differing delays are connected or substituted over time. For example, replacing an analog TV with a digital HDTV may necessitate matching the delay between the audio signal processing path and the video signal processing path, because the digital HDTV may include significantly more video processing and video path delay than the analog TV. Similarly, replacing purely analog speakers with wireless speakers or speakers that include other audio processing circuitry such as digital surround sound decoding may necessitate matching the delays in the audio signal processing path with respect to the video signal processing path.

Figure 1:
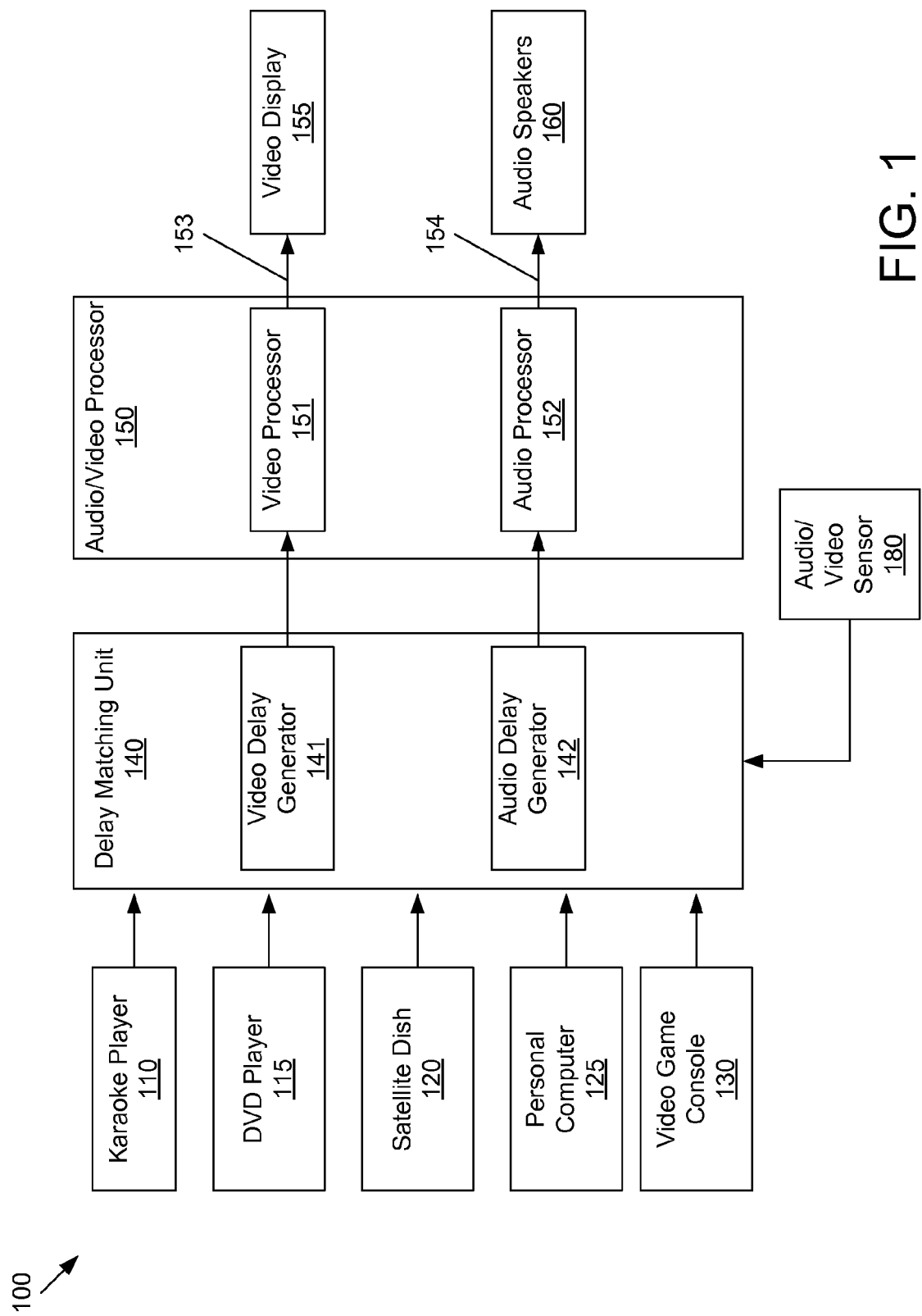
FIG. 1 illustrates a block diagram of an audio/video system (e.g. a home theater) including a delay matching unit, in one embodiment in accordance with the present invention.

FIG. 1 illustrates a block diagram of an audio/video system (e.g., a home theater) 100 including a delay matching unit 140, in one embodiment in accordance with the present invention. The audio/video system 100 includes a number of audio/video sources for playing content: a Karaoke player 110, a DVD player 115, a satellite dish 120, a personal computer (PC) 125, and a video game console 130. Generally, one of the audio/video sources 110-130, for example the video game console 130, is selected by a viewer for playing content. The audio portion of the content from the video game console 130 is decoded or otherwise processed (e.g., amplified) by an audio processor 152 of an audio/video processor 150. Similarly, the video portion of the content is decoded or otherwise processed by a video processor 151 of the audio/video processor 150, for example by Moving Picture Experts Group (MPEG) decoding. Although depicted as separate component blocks, the audio processor 152 and the video processor 151 may be integrated into a single physical component.

A video output 153 of the audio/video processor 150 drives a video display 155. For example, the video output 153 may comprise composite video, S-video, or digital video such as High Definition Multimedia Interface (HDMI) or Digital Visual Interface (DVI) signals driving the video display 155. The video display 155 may comprise an analog TV, a digital HDTV, or other video monitor. The audio/video processor 150 includes one or more audio outputs 154 to drive a number of audio speakers 160. The audio speakers 160 may include left and right front speakers, left and right rear speakers, and a subwoofer, for example.

Although not specifically enumerated in FIG. 1, the audio/video system 100 includes an audio signal processing path with an audio path delay. The audio signal processing path includes audio processing circuitry within the selected audio/video source 110-130, the audio/video processor 150, and the audio speakers 160. The audio path delay comprises the total delay in time between the content played by the audio/video source 110-130 and the output of the audio speakers 160. The audio speakers 160 may contribute to the audio path delay, for example if the audio speakers 160 are connected to the audio/video processor 150 by a wireless link, or other delay-inducing components such as digital surround sound decoding.

Similarly, the audio/video system 100 includes a video signal processing path with a video path delay. The video signal processing path includes video processing circuitry within the selected audio/video source 110-130, the audio/video processor 150, and the video display 155. Consequently, the video path delay comprises the total delay in time between the content played by the audio/video source 110-130 and the output of the video display 155.

As described further herein, the delay matching unit 140 is configured to match the audio path delay with the video path delay by way of a video delay generator 141 and/or an audio delay generator 142. The video delay generator 141 and the audio delay generator 142 may comprise configurable analog delay lines or, preferably, digital delay mechanisms. For example, the video processor 151 and the audio processor 152 of some embodiments include digital signal processing (DSP) circuitry (not shown). Based upon a determination that the video display 155 is lagging (delayed in time from) the sound from the audio speakers 160, the delay matching unit 140 may command the DSP circuitry to add delay into the audio signal processing path by way of the audio delay generator 142. Alternatively, based upon a determination that the audio speakers 160 are lagging (delayed in time from) the video display 155, the delay matching unit 140 may command the DSP circuitry to add delay by way of the video delay generator 141 into the video signal processing path.

The delay matching unit 140 may be "upstream" (before) the audio/video processor 150, or may be "downstream" (after) the audio/video processor 150. Further, the delay matching unit 140 is shown as separate from the audio/video processor 150 and the audio/video sources 110-130, but may be integrated into the audio/video processor 150 or the audio/video sources 110-130. With the delay matching unit 140 integrated into the audio/video sources 110-130, the audio and video portions of the content from the audio/video sources 110-130 may be directly controlled by the delay matching unit 140.

Figure 2:
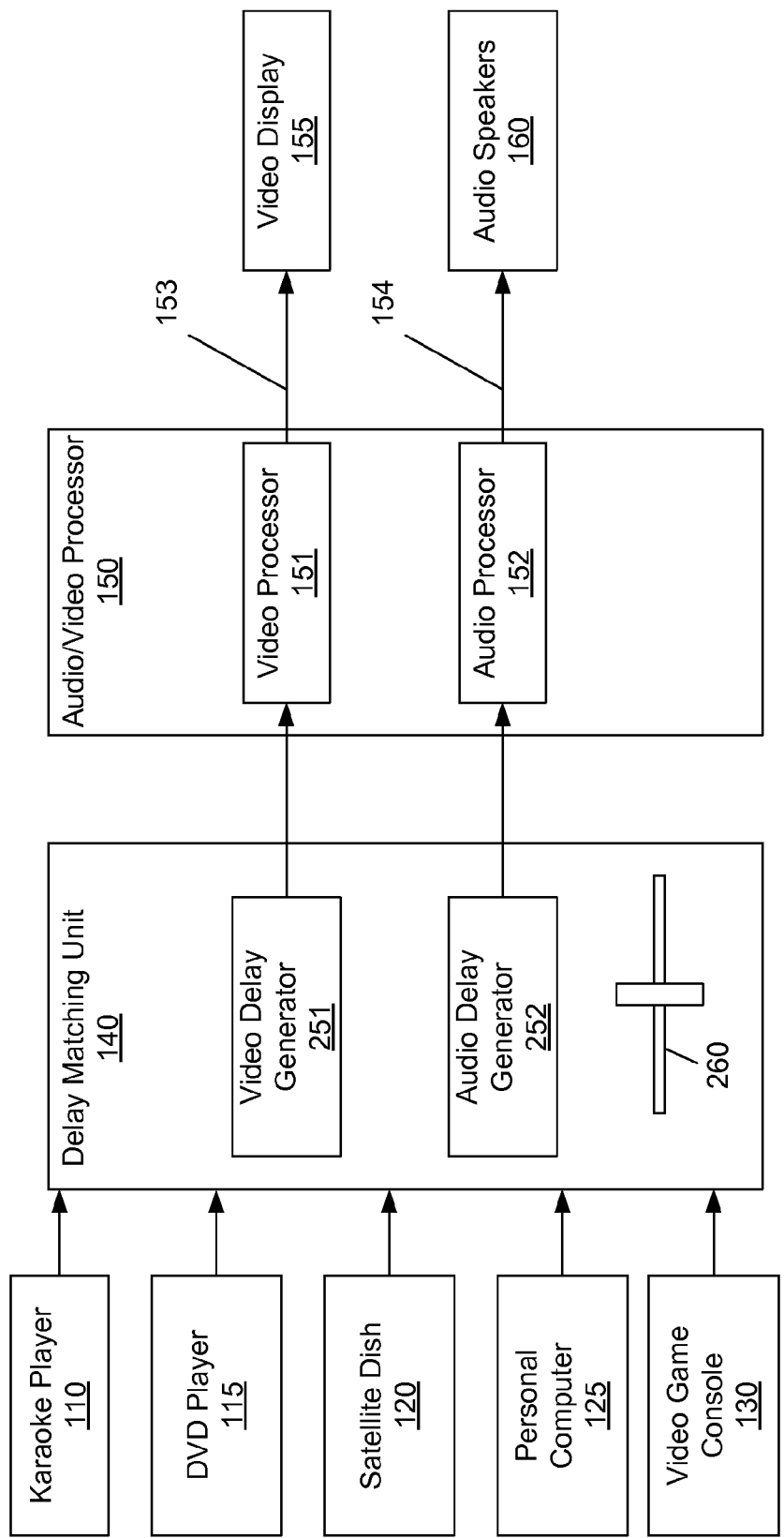
FIG. 2 illustrates the delay matching unit of FIG. 1 including a manual slider for manual matching of the audio path delay and the video path delay, in one embodiment in accordance with the present invention.

With the delay matching unit 140 as a separate unit from the audio/video sources 110-130, the assumption is made that the audio portion is in sync the video portion from the audio/video sources 110-130, or that manual matching is performed as described with respect to FIG. 2. Further, as described with respect to FIGS. 3-4, the delay matching unit 140 may be configured to generate an audio/video stimulus used to match the audio path delay and the video path delay in the system 100.

Figure 3:
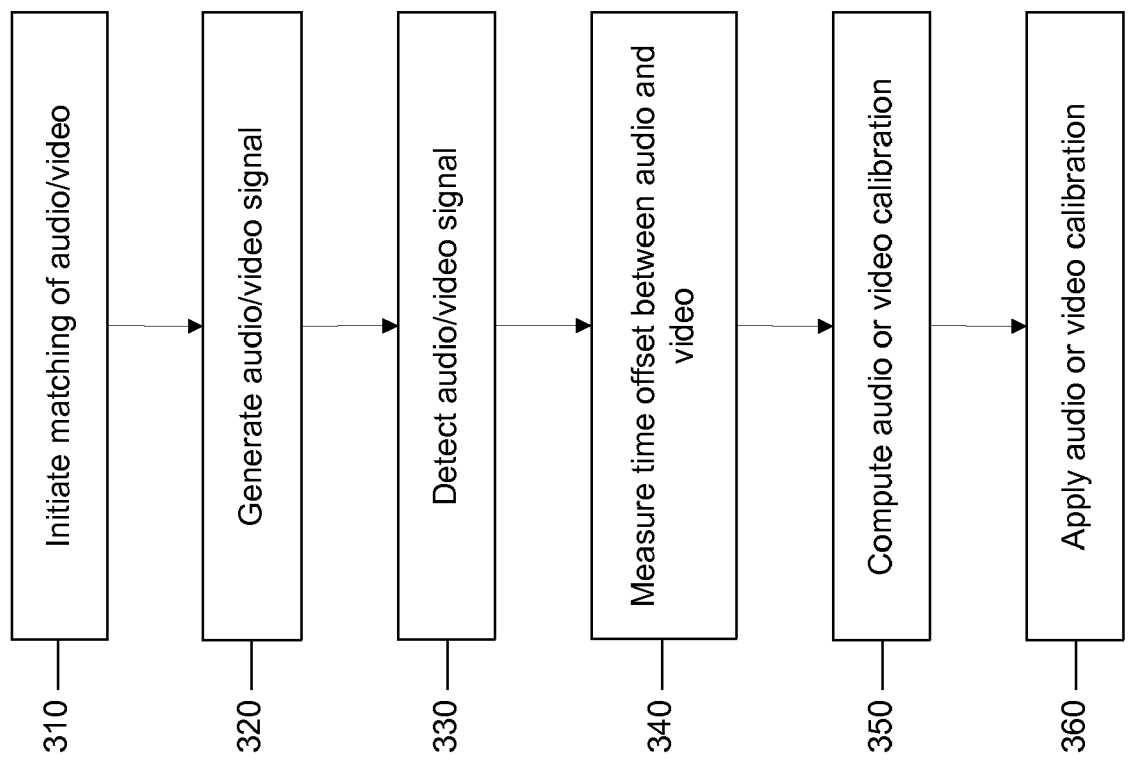
FIG. 3 illustrates a method for fully automated delay matching in the audio/video system of FIG. 1, in one embodiment in accordance with the present invention.
Figure 4:
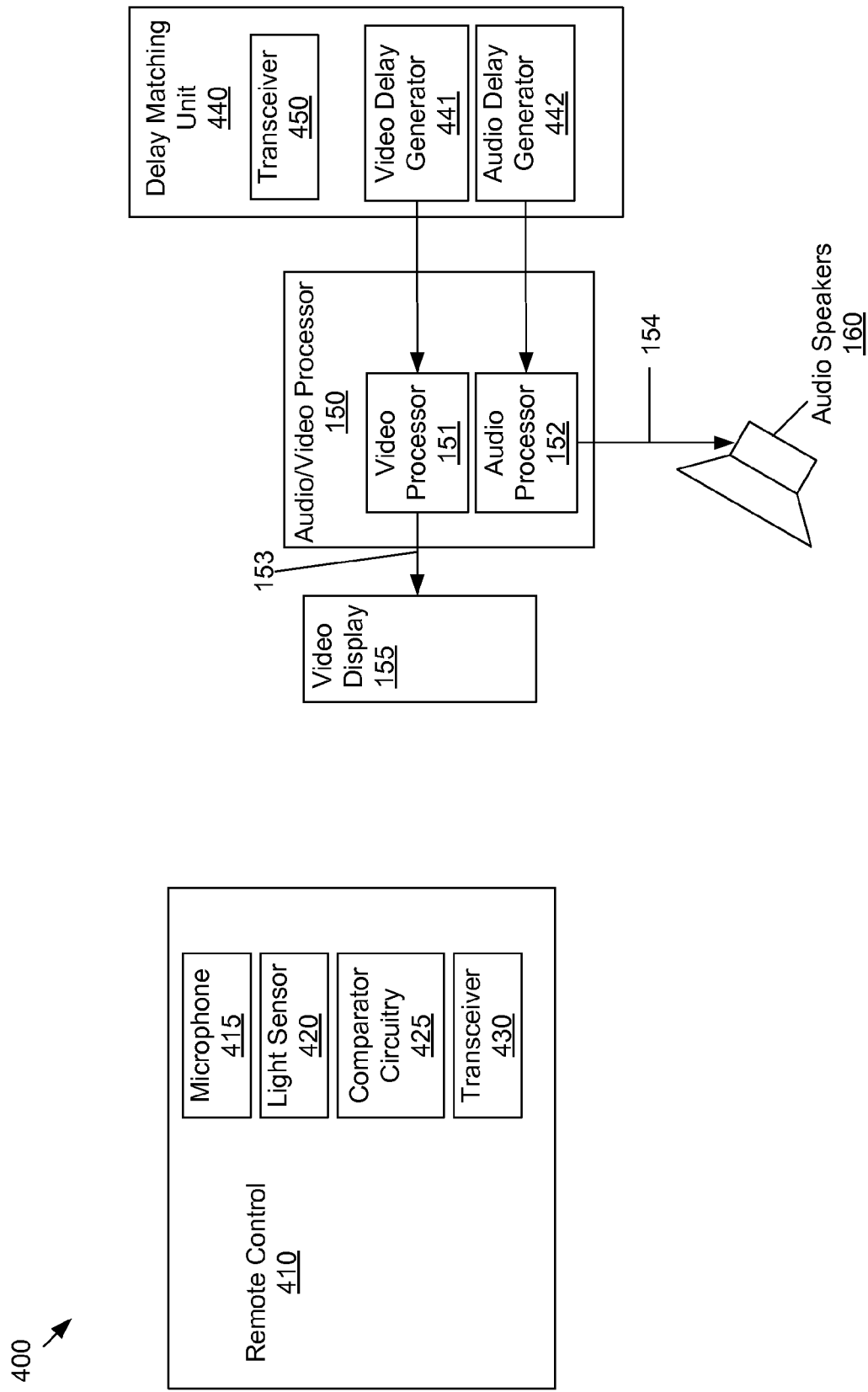
FIG. 4 illustrates a home theater room in which an audio/video system includes delay matching by incorporating a remote control with audio/video sensors, in one embodiment in accordance with the present invention.

As described further with respect to FIGS. 3-5, the audio/video system 100 includes an audio/video sensor 180. The audio/video sensor 180 is shown connected to the delay matching unit 140, but the audio/video sensor 180 may be connected to other devices within the system 100 such as the Karaoke player 110 or the PC 125. The audio/video sensor 180 provides hardware and/or software elements that allow the audio/video system 100 to detect and "timestamp" an audio/video stimulus, by which the audio/video system 100 may detect errors in synchronization of the audio signal processing path and the video signal processing path. For example, the audio/video sensor 180 may comprise a microphone or other audio sensor capable of detecting an audio stimulus (e.g., a sound or tone) and determining a timestamp for the audio stimulus. The audio/video sensor 180 may include a light sensitive device such as a photodiode or phototransistor, a charge-coupled device (CCD), or a CMOS image sensor for detecting and determining a timestamp for a video stimulus. Typically, the audio/video sensor 180 has a predetermined relationship between the audio stimulus and its associated audio timestamp, and the video stimulus and its associated video timestamp, or may be calibrated within the system 100 as described further with respect to FIG. 5.

The audio/video sensor 180 of some embodiments comprises an EyeToy™ incorporating a CMOS image sensor, available from Sony Computer Entertainment America Inc. of Foster City, Calif., connected to a Sony PlayStation®2 computer entertainment system, also available from Sony. In other embodiments, the audio/video sensor 180 comprises a "webcam" coupled to the PC 125, or a camcorder coupled to the Karaoke player 110.

The audio/video sensor 180 can be considered as able to detect the audio/video stimulus "after" the outputs of the audio signal processing path and the video signal processing path. For example, the audio/video sensor 180 detects the audio stimulus after it has been projected from the audio signal processing path into the environment (e.g., as an audible sound) around the audio/video system 100. Similarly, the audio/video sensor 180 detects the video stimulus after it has been projected from the video signal processing path (e.g., as a visible light pattern).

FIG. 2 illustrates the delay matching unit 140 of FIG. 1 including a manual slider 260 for manual matching of the audio path delay and the video path delay, in one embodiment in accordance with the present invention. The slider 260 is coupled to a video delay generator 251 and an audio delay generator 252 such that, based upon the position of the slider 260, additional delay is added into the audio signal processing path or the video signal processing path.

The video delay generator 251 and the audio delay generator 252 may comprise configurable analog delay lines or, preferably, digital delay mechanisms. For example, the video processor 151 and the audio processor 152 of some embodiments include digital signal processing (DSP) circuitry (not shown). Based upon a determination by the viewer that the video display 155 is lagging (delayed in time from) the sound from the audio speakers 160, the viewer may move the slider 260 and thence command the DSP circuitry to add delay into the audio signal processing path by way of the audio delay generator 252. Alternatively, based upon a determination by the viewer that the audio speakers 160 are lagging (delayed in time from) the video display 155, the viewer may move the slider 260 and thence command the DSP circuitry to add delay by way of the video delay generator 251 into the video signal processing path.

The slider 260 for controlling the delay of the audio signal processing path with respect to the video signal processing path may be implemented in a number of ways. For example, in some embodiments, the slider 260 comprises a "virtual slider" graphic element (not shown) displayed on the video display 155 which the viewer can control by use of a front panel control or remote control. The slider 260 can be considered to adjust to the relative delay (i.e., relative time offset or synchronization) between the audio signal processing path and the video signal processing path in the audio/video system 100.

FIG. 3 illustrates a method for fully automated delay matching in the audio/video system 100 of FIG. 1, in one embodiment in accordance with the present invention. At step 310, the audio/video system 100 initiates delay matching of the audio signal processing path and the video signal processing path. In some embodiments, the audio/video system 100 initiates matching in response to a request of the user. In alternative embodiments, the audio/video system 100 initiates matching upon occurrence of a predetermined event, such as upon power-up, upon the viewer changing the selected audio/video source 110-130, or at other convenient times, such as during a black pause before going to a commercial of a broadcast program.

In still other embodiments, the audio/video system 100 initiates matching based upon signals prestored on the media to be played by the audio/video system 100 along with the desired content. For example, assuming audio and video outputs of the DVD player 115 are relatively well synchronized, the signals that initiate matching of audio and video may be stored on a DVD-ROM in the DVD player 115, along with the movie (content) to be played by the DVD player 115. The DVD-ROM may also include the actual audio and video stimuli by which the audio path delay and the video path delay are synchronized.

At step 320, the audio/video system 100 generates an audio stimulus by way of the audio speakers 160 and a video stimulus by way of the video display 155. The audio stimulus and the video stimulus may be simultaneous, or may be offset by a predetermined time. The audio stimulus and the video stimulus may also comprise step-function, impulsive, or periodically changing signals. For example, the audio stimulus may cause a periodic change in the output of the audio speakers 160 from inaudible to audible, or from one tone (frequency) to a second tone, at about a 2 to 4 Hz rate. Similarly, the video stimulus may cause the video display 155 to change from a low intensity light output to a high intensity light output, to cycle between low and high intensity light output at about a 2 to 4 Hz rate, and/or to change color, for example from solid green to solid red.

In some embodiments, the audio stimulus comprises a predetermined audio tone of known duration with an associated video stimulus comprising a signal to switch the video display 155 from bright red to bright green. For example, the audio tone may be generated and persist for approximately one-half second, during which time the video display 155 displays bright red. Upon the end of the audio tone, the video stimulus substantially simultaneously causes the video display 155 to switch to bright green. In other embodiments, the audio/video stimulus comprises a varying intensity of light output from the video display 155 by switching between white and black screens, for example, in conjunction with an audio pattern such as two tones switching back-and-forth.

At step 330, the audio/video sensor 180 detects the change in the video display 155 and the audio speakers 160 caused by the audio/video stimulus. Although the audio/video sensor 180 (e.g., the EyeToy) may face the viewer and not directly face the video display 155, the audio/video sensor 180 can detect light reflected off the face of the viewer or other objects in the room. Reflected light detection is generally sufficient in most viewing rooms in which the viewer prefers relatively low ambient light levels. For example, the EyeToy can generally discern a bright green screen generated by the video display 155 illuminating the room, because the color balance of the detected image is significantly changed with respect to a bright red screen generated by the video display 155 illuminating the room. Alternatively, the audio/video sensor 180 may be pointed toward the video display 155 to directly sample the light output of the video display 155, which may be advantageous if the ambient light is very bright in the room, for example because of direct sunlight.

Prior to step 330, the audio/video sensor 180 may have been programmed to provide filtering, time-gating, and/or threshold functions to prevent false detection of the audio/video stimulus. For example, the EyeToy may be programmed to disable auto white balance settings to enhance color change detection.

At step 340, the delay matching unit 140 measures the time offset between the audio/video stimulus detected at step 330. At step 350, the delay matching unit 140 computes a corresponding audio or video calibration value to be applied to the audio signal processing path or the video signal processing path that would substantially cancel the measured time offset.

At step 360, the delay matching unit 140 applies the computed audio or video calibration value to the audio delay generator 142 or the video delay generator 141. The calibration value substantially equalizes the delays of the audio signal processing path and the video signal processing path.

An advantage of delay matching in the audio/video system 100 described with respect to FIGS. 1-3 is relatively easy, low cost delay matching. For example, the delay matching mechanisms described are easily configured to operate with existing, commercially-available components.

FIG. 4 illustrates a home theater room in which an audio/video system 400 includes delay matching by incorporating a remote control 410 with audio/video sensors 415 and 420, in one embodiment in accordance with the present invention. For simplicity of illustration and explanation, the audio/video system 400 depicted includes only a delay matching unit 440, the audio/video processor 150, the video display 155, and audio speakers 160, although other components such as the audio/video sources 110-130 may be included in the audio/video system 400. In similar fashion to that described herein with respect to FIG. 1, the audio/video system 400 includes an audio signal processing path with an audio path delay and a video signal processing path with a video path delay (not numbered).

The remote control 410 includes audio/video sensors: a microphone 415 to detect an audio stimulus, and a light sensor 420 to detect a video stimulus. The light sensor 420 of some embodiments comprises a light-sensitive photocell configured to detect whether the video display 155 is lit or dark. In some embodiments, the light sensor 420 is configured to detect color changes in the video display 155.

The remote control 410 also includes timestamp and comparator circuitry 425 to measure the time difference between the detected audio stimulus and the detected video stimulus. An infrared (IR) or radio frequency (RF, e.g. Bluetooth) transceiver 430 in the remote control 410 allows communication of the measured time offset to a corresponding transceiver 450 in the delay matching unit 440. The remote control 410 may include filtering, time-gating, and/or threshold circuitry to prevent false detection of the audio/video stimulus.

Referring to the method depicted in and described with respect to FIG. 3, at step 310 the delay matching unit 440 of the audio/video system 400 initiates delay matching of the audio signal processing path and the video signal processing path. At step 320, the audio/video system 400 generates an audio stimulus and projects the audio stimulus into the home theater room via the audio speakers 160. The audio/video system 400 generates a video stimulus and projects the video stimulus into the home theater room via the video display 155.

At step 330, the remote control 410 detects the audio/video stimulus. The microphone 415 detects the audio stimulus and the light sensor 420 detects the video stimulus. The remote control 410 can be considered to be detecting the audio/video stimulus after the outputs of the audio signal processing path and the video signal processing path. Prior to step 330, the remote control 410 may be initialized, for example to tune the remote control 410 to detect the particular audio/video stimulus.

At step 340, the comparator circuitry 425 measures the time difference between the detected audio and video stimuli. The transceiver 430 of the remote control 410 communicates the measured time offset to the corresponding transceiver 450 in the delay matching unit 440.

At step 350, the delay matching unit 440 computes a corresponding audio or video calibration value to be applied to the audio signal processing path or the video signal processing path that would substantially cancel the measured time offset. At step 360, the delay matching unit 440 applies the computed audio or video calibration value to the audio delay generator 442 or the video delay generator 441. The calibration value substantially equalizes the delays in the audio signal processing path and the video signal processing path.

In an alternative embodiment, rather than the remote control 410 measuring the time offset between the detected audio/video stimulus, the remote control 410 acts as a "mirror" with a predetermined delay with respect to the incoming audio/video stimulus, and sends a mirror signal to be measured by the delay matching unit 440. The remote control 410 has a deterministic delay between the time that it detects the audio/video stimulus and the time that it transmits the mirror signal. For example, upon detecting the audio signal generated by the audio speakers 160, the remote control 410 sends a first mirror signal to the delay matching unit 440 after a predetermined delay, and upon detecting the video signal generated by the video display 155, the remote control 410 sends a second mirror signal to the delay matching unit 440 after a predetermined delay. Comparator circuitry (not shown) in the delay matching unit 440 measures the time difference between the first mirror signal and the second mirror signal. The delay matching unit 440 computes a corresponding audio or video calibration value to be applied to the audio signal processing path or the video signal processing path that would substantially cancel the measured time offset. The delay matching unit 440 applies the computed audio or video calibration value to the audio delay generator 442 or the video delay generator 441 to substantially equalize the delays in the audio signal processing path and the video signal processing path.

The mirror signal may comprise an IR or RF signal to be detected by the corresponding transceiver 450 in the delay matching unit 440. Alternatively, the mirror signal may comprise an IR or visual signal (e.g., from an LED on the remote control 410) to be detected by the audio/video sensor 180 coupled to the delay matching unit 440. For example, a predetermined time after detecting the audio stimulus, the remote control 410 may transmit an IR signal to the delay matching unit 440. A predetermined time after detecting the video stimulus, the remote control may transmit a second IR signal to the delay matching unit 440. Comparator circuitry in the delay matching unit 440 measures the time between the first IR signal and the second IR signal, which time delay corresponds to the difference between the audio path delay and the video path delay. In this fashion, the remote control 410 acts like a mirror with a predetermined delay to signal detection of the audio stimulus and the video stimulus so that the delay matching unit 440 can measure the time offset between the audio and video stimuli.

An advantage of the embodiments described with respect to FIG. 4 is that the remote control 410 is typically in the "line of sight" of the video display 155, and/or pointed at the video display 155, which obviates the detection of reflected light as described with respect to FIG. 3. Another advantage is that the remote control 410 is in the reference of the viewer, not at the reference of the video display 155, so any flight time delay in the room or reflections in the room are not included in the computation of calibration values.

FIG. 5 illustrates an optional calibration method for the audio/video sensor 180 of FIG. 1, in one embodiment in accordance with the present invention. The method of FIG. 5 may be advantageous, for example, if the audio/video sensor 180 is not known to accurately measure the relative timing of audio and video stimuli detected in the audio/video sensor 180.

The method provides an event in the real world (e.g., a handclap of the user) to be sensed by the audio/video sensor 180, so that any audio/video sensor 180 (e.g., a camcorder or webcam) may be calibrated for use in delay matching as described herein. For example, with a webcam for the audio/video sensor 180, the webcam may 'see' and 'hear' the handclap and convert the handclap into an audio signal and a video signal. The audio signal and the video signal into the PC 125 may include unknown delays in the video and/or audio paths before the signals reach the PC 125. If the audio/video system 100 measures the time at which the PC 125 receives the audio and video signals resulting from the handclap, the PC 125 may receive the audio and video signals at different times (out of synchronization). Essentially, the method of FIG. 5 corrects mismatch of the audio path delay and the video path delay due to the audio/video sensor 180. In other words, a predetermined simultaneous audio and video event is used to calibrate the audio/video sensor 180 so that the audio stimulus and the video stimulus are measured as simultaneous even if the audio/video sensor 180 reports otherwise.

At step 510, the user of the audio/video system 100 initiates audio/video sensor 180 calibration, for example by selecting a menu option on a display (not shown) of the delay matching unit 140 or the video display 155. At step 520, the audio/video system 100 prompts the viewer to generate an audio/video stimulus. For example, the audio/video system 100 may prompt the viewer to stand relatively close to the audio/video sensor 180 and say "Hi" into the audio/video sensor 180. Alternatively, the audio/video system 100 displays on the video display 155 a live image of the viewer as captured by the audio/video camera (e.g., the EyeToy) 180, and superimposes a graphic of a box on the video display 155 beside the image of the viewer. The audio/video system 100 then prompts the viewer (e.g., by text on the video display 155) to clap his hands inside the box graphic.

At step 530, the audio/video sensor 180 detects the audio/video stimulus, e.g., the movement of the user's lips and the corresponding speech, or the hands of the viewer entering the box on the video display 155 and the sound of the associated handclap. The audio/video sensor 180 then generates an audio timestamp and a video timestamp for the detected audio/video stimulus. The audio and video timestamps may be generated in a number of ways. For example, the detection of the audio stimulus may trigger sampling of a running digital counter, which yields a digital timestamp for the audio signal.

At step 540, the delay matching unit 140 measures the time offset between the detected audio stimulus and the detected video stimulus. The time offset may be computed by subtracting the lesser of the audio timestamp and the video timestamp from the greater of the audio timestamp and the video timestamp. At step 550, the delay matching unit 140 computes a corresponding audio or video calibration value that would substantially cancel the measured time offset and synchronize the audio signal processing path with the video signal processing path. For example, the calibration value may comprise a value that sets the audio path delay equal to the video path delay, with a resolution less than $\frac{1}{30}^{th}$ of a second. At step 560, the delay matching unit 140 applies the computed audio or video calibration value to substantially equalize the detected delays in the audio signal processing path and the video signal processing path from the audio/video sensor 180.

The invention has been described above with reference to specific embodiments. It will, however, be evident that various modifications and changes may be made thereto without departing from the broader spirit and scope of the invention as set forth in the appended claims. For example, the audio/video sensors may be implemented in a variety of ways, the computation of the calibration value may be performed with various methods, and the sensing, measuring, and computation functions may be implemented in other parts of the audio/video system without departing from the scope of the invention. In a specific example, the audio/video sensor 180 of FIG. 1 may be connected to the video game console 130 which is directly connected to an HDTV video display 155 with relatively large video path delay and to the audio speakers 160 via an audio amplifier with little audio path delay. The functions of the delay matching unit 140 and the audio/video processor 150 are therefore distributed between the HDTV and the audio amplifier, but principles of the invention still apply for delay matching. In another example, a microphone connected to the Karaoke player 110 may be used for detecting the audio stimulus described with respect to FIG. 4. The foregoing description and drawings are, accordingly, to be regarded in an illustrative rather than a restrictive sense.

What is claimed is:

1. A system for synchronizing audio signals and video signals, the system comprising:
    an audio signal processing path configured to generate an audio stimulus;
    a video signal processing path configured to generate a video stimulus;
    a sensor configured to detect a difference between an audio path delay of the audio signal processing path based on the audio stimulus and a video path delay of the video signal processing path based on the video stimulus, wherein the sensor comprises an audio-video camera; and
    a delay generator configured to adjust the audio path delay to be substantially equal to the video path delay.

2. The system of claim 1, wherein the delay generator is configured to add delay into the video signal processing path if the audio path delay is greater than the video path delay, or add delay into the audio signal processing path if the video path delay is greater than the audio path delay.

3. The system of claim 1, wherein the audio signal processing path and the video signal processing path comprise a home theater system.

4. The system of claim 3, wherein the home theater system comprises substitutable audio/video components.

5. The system of claim 1, wherein the audio signal processing path and the video signal processing path include an audio-video processor, the delay generator included within the audio-video processor.

6. The system of claim 1, wherein the audio signal processing path and the video signal processing path include an audio-video processor, and wherein the delay generator is coupled to the audio-video processor.

7. The system of claim 1, wherein the delay generator is further configured to adjust the audio path delay equal to the video path delay with a resolution of less than about $\frac{1}{30}^{th}$ of a second.

8. The system of claim 1, wherein the audio signal processing path includes a player of media content, the media content including the audio stimulus and the video stimulus.

9. The system of claim 8, wherein the player of media content comprises a video game system.

10. The system of claim 8, wherein the player of media content comprises the delay generator.

11. A method for synchronizing audio signals and video signals, the method comprising:
- generating an audio stimulus in an audio signal processing path and a video stimulus in a video signal processing path;
- detecting the audio stimulus after an output of the audio signal processing path, wherein detecting the audio stimulus comprises sensing the audio stimulus with an audio-video camera;
- detecting the video stimulus after an output of the video signal processing path, wherein detecting the video stimulus comprises sensing the video stimulus with the audio-video camera;
- measuring a time offset between the detected audio stimulus and the detected video stimulus; and
- determining a calibration value that substantially cancels the measured time offset.

12. The method of claim 11, further comprising:
- calibrating the audio-video camera for detecting the audio stimulus by prompting a user to provide the audio stimulus to the audio-video camera; and
- calibrating the audio-video camera for detecting the video stimulus by prompting the user to provide the video stimulus to the audio-video camera.

13. The method of claim 11, further comprising adding delay based on the calibration value to the audio path if the detected audio stimulus precedes the detected video stimulus.

14. The method of claim 11, further comprising adding delay based on the calibration value to the video path if the detected video stimulus precedes the detected audio stimulus.

15. The method of claim 11, further comprising correcting for measurement delays in a sensor configured to measure the time offset.

* * * * *